(12) United States Patent
King

(10) Patent No.: US 11,317,607 B2
(45) Date of Patent: May 3, 2022

(54) TREAT DISPENSING PET TOY

(71) Applicant: Tanimola King, Miami, FL (US)

(72) Inventor: Tanimola King, Miami, FL (US)

( * ) Notice: Subject to any disclaimer, the term of this patent is extended or adjusted under 35 U.S.C. 154(b) by 167 days.

(21) Appl. No.: 16/870,067

(22) Filed: May 8, 2020

(65) Prior Publication Data

US 2021/0112778 A1    Apr. 22, 2021

Related U.S. Application Data

(60) Provisional application No. 62/934,810, filed on Nov. 13, 2019, provisional application No. 62/923,692, filed on Oct. 21, 2019.

(51) Int. Cl.
*A01K 15/02* (2006.01)
*A01K 5/00* (2006.01)

(52) U.S. Cl.
CPC ............. *A01K 15/026* (2013.01); *A01K 5/00* (2013.01)

(58) Field of Classification Search
CPC .... A01K 15/025; A01K 15/026; A01K 15/02; A01K 5/00
See application file for complete search history.

(56) References Cited

U.S. PATENT DOCUMENTS

| | | | |
|---|---|---|---|
| 8,240,273 B2 * | 8/2012 | Benson | A01K 5/0114 119/51.01 |
| 9,119,377 B2 | 9/2015 | Gratza | |
| 11,102,956 B1 * | 8/2021 | Rutherford | A01K 15/026 |
| 2007/0234969 A1 * | 10/2007 | Lynch | A01K 15/02 119/707 |
| 2009/0071412 A1 * | 3/2009 | Ritchey | A01K 15/025 119/709 |
| 2010/0147229 A1 | 6/2010 | DeFazio | |
| 2011/0259282 A1 * | 10/2011 | Tsengas | A01K 15/025 119/707 |
| 2015/0373950 A1 * | 12/2015 | Spring | A01K 15/026 426/282 |

OTHER PUBLICATIONS https://www.petmountain.com/product/kong-ballistic-hide-n-treat-dog-toy?variant=175098gclid=CjwKCAjw0vTtBRBREiwA3URt7pzymGU0Ad82MzqZXsCD1yld9_Hcdo7e9ALmj6ERVZy6iEuHWinPpRoCeb0QAvD_BwE, accessed Nov. 7, 2019, published no later than Oct. 31, 2016.
https://www.cleanrun.com/product/small_lotus_ball/index.cfm, accessed Nov. 7, 2019, published no later than Feb. 20, 2019.

* cited by examiner

*Primary Examiner* — Trinh T Nguyen
(74) *Attorney, Agent, or Firm* — Fleit Intellectual Property Law; Paul D. Bianco

(57) ABSTRACT

The use of adjustable arms or flaps combined with hook and loop fasteners connect to toys or treat dispensers in different positions to create varying levels of play for all dog types and ages. Adjusting arm connections allows to create different difficulty levels keeps dogs entertained physically and mentally. The adjustable arms create adjustable connections that create new forms of play for varying dog sizes, strengths, and ages.

18 Claims, 3 Drawing Sheets

TREAT DISPENSING PET TOY

FIELD OF THE DISCLOSURE

The disclosure relates to a pet toy that rewards a pet with a treat if the pet is able to successfully access the treat contained within the toy.

BACKGROUND

Many people have experienced both the joys and frustrations of pet ownership. Some of these frustrations result, often unknowingly, from the pet owner. Pets need exercise, play, and mental stimulation for a healthy lifestyle. This is why dogs, cats, and other domestic pets can play almost to the point of exhaustion with toys such as balls, ropes, stuffed animals, and other appropriate objects. Such behavior is instinctive to animals and can help keep a pet physically and psychologically healthy.

When there are no toys available for a pet or the pet is not otherwise engaged, the pet may exhibit undesirable behavior and become aggressive with items such as furniture, walls, shoes, or clothing. In an effort to address these issues, a wide variety of pet toys and other accoutrements are available.

Some of these pet toys are, for a wide variety of different reasons, simply of no interest to a particular pet. Some pet toys, while initially generating an interest from a pet, eventually become unattractive to the pet over time since the toy no longer presents any challenge, either physically or mentally to the pet. Other pet toys are not durable enough to withstand ordinary use.

Thus, there exists a need for an improved pet toy.

SUMMARY OF THE DISCLOSURE

In one embodiment, the pet toy comprises an inner component having a body with at least a portion of an outer surface of the body including one of a hook portion and a loop portion of a hook and loop fastener; and an outer component comprising a base with a plurality of arms extending from the base. Each of the plurality of arms includes at least one section with the other of the hook portion and loop portion of the hook and loop fastener. With the inner component positioned on the base, the plurality of arms is wrappable about the inner component such that the hook portion and loop portion of the hook and loop fastener engage to removably attach the inner and outer components. The plurality of arms is wrappable about the inner component in different configurations to alter the removable attachment of the inner and outer components.

The body can have a compartment accessible through an opening.

In an exemplary embodiment, the inner component has the loop portion of the hook and loop fastener on the outer surface of the body and the inner component is in the form of a ball.

The plurality of arms can comprise a first plurality of arms and a second plurality of arms. Each of the first plurality of arms includes one section with the hook portion of the hook and loop fastener and each of the second plurality of arms includes at least two sections with the hook portion of the hook and loop fastener. Each of the first plurality of arms has a first length and each of the second plurality of arms has a second length. In some embodiments, the first length is less than the second length.

In one particular arrangement, the first plurality of arms comprises first and second arms extending outwardly from the base in opposite directions. The second plurality of arms includes a lead arm extending from the base such that the lead arm is substantially orthogonal to the first and second arms. The second plurality of arms includes first and second base arms, with the first base arm extending from the base such that first base arm and the first arm form an acute angle and the second base arm extending from the base such that second base arm and the second arm form an acute angle.

In another embodiment, the pet toy comprises an inner component having a body with a compartment accessible through an opening. An outer surface of the body includes a loop portion of a hook and loop fastener. An outer component comprises a base with a plurality of arms extending from the base. Each of the plurality of arms has a distal end and includes at least one section with the hook portion and loop portion of the hook and loop fastener. For each of the plurality of arms the at least one section is spaced from the distal end. With the inner component positioned on the base, the plurality of arms is wrappable about the inner component such that the hook portion and loop portion of the hook and loop fastener engage to removably attach the inner and outer components. The plurality of arms is wrappable about the inner component in different configurations to alter the removable attachment of the inner and outer components.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
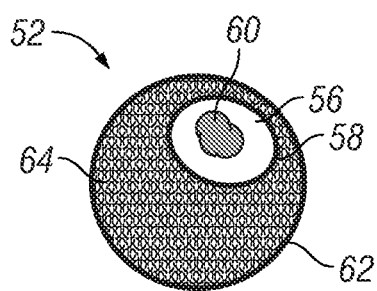
FIG. 1 shows a first embodiment of an inner component of the treat dispensing toy according to the disclosure.

As required, embodiments are disclosed herein; however, it is to be understood that the disclosed embodiments are merely examples and that the methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

FIGS. 1, 3, and 5-7 show a first embodiment of a treat dispensing toy 50 according to the disclosure and FIGS. 2, 4, and 8-10 show a second embodiment of a treat dispensing toy 150 according to the disclosure. Since treat dispensing toy 150 is generally similar to treat dispensing toy 50, the same reference numerals will be utilized to identify the same or substantially similar components.

Treat dispensing toy 50 includes an inner component 52 enclosed, at least to some degree, within an outer component 54. The manner and degree to which inner component 52 is enclosed within outer component 54 provides a variability and adjustability that is one aspect of the disclosure as set forth in more detail below.

In general, hook and loop fasteners are used to conceal toy parts or treat dispensing pocket. The pet owner can connect the parts in any order for the pet to disconnect, pull open, or dissemble. The use of adjustable arms or flaps with hook and loop fasteners creates varying levels of play. The adjustable arms may vary in strength and size for dynamic play and puzzle creation. The adjustable arms may be combined with different toy types and pulled apart in different ways for multiple dog sizes and breeds. The adjustable arms create adjustable connections that create new forms of play for varying dog sizes, strengths, and ages. This dynamic form of play may be used to stimulate pets mentally, invoke and satisfy the pets natural instinct, feed the pet, and/or entertain the pet.

Figure 2:
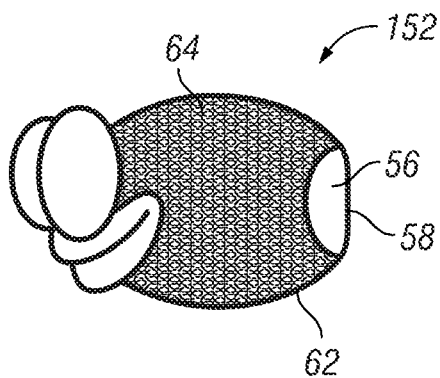
FIG. 2 shows a second embodiment of the inner component of the treat dispensing toy according to the disclosure.

As shown in FIG. 1, inner component 52 is generally in the shape of a ball. The disclosure contemplates that any suitable shape could be used. For example, as shown in FIG. 2, inner component 152 is in the form of a cartoon-like animal so that the pet may be visually attracted to inner component 152. The body of inner component 52, 152 includes a compartment 56 accessible through an opening 58. A pet treat 60, food reward, or any other substance that a particular pet will try to reach can be placed in compartment 56.

The type, number, shape and size of pet treat 60 relative to the size and shape of opening 58 can be selected to make removing pet treat 60 from compartment 56 by the pet more or less challenging. In this regard, the disclosure contemplates that opening 58 can be partially or completely covered.

At least a portion of an outer surface of body 62 of inner component 52, 152 is provided with either a hook portion or loop portion of a hook or loop fastener. Although inner component 52, 152 is preferably constructed so that at least a portion of an outer surface of body 62 is fabricated with either the hook portion or loop portion, an existing toy or other suitable object can be retrofitted to have either hook portion or loop portion added thereto.

Figure 3:
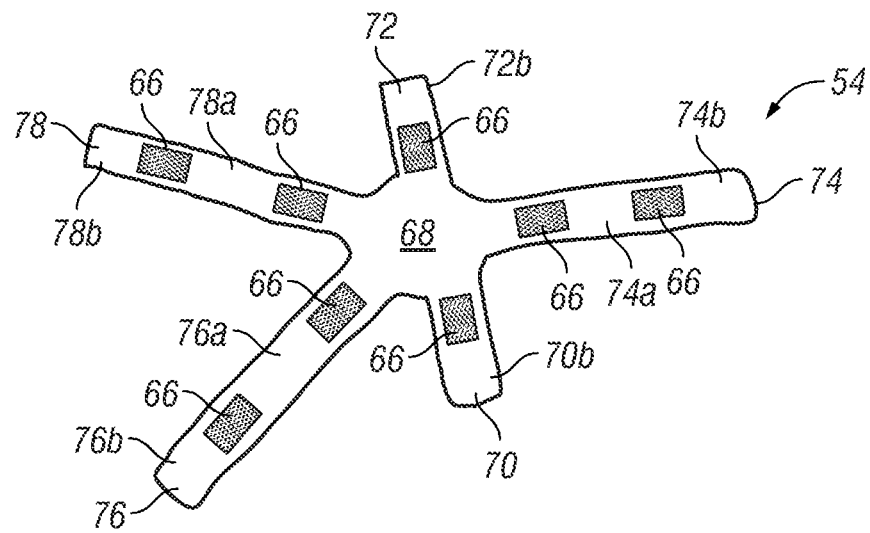
FIG. 3 shows a first embodiment of an outer component of the treat dispensing toy according to the disclosure.

As shown in FIGS. 1 and 2, body 62 has loop portion 64. Loop portion 64 mates with corresponding hook portions 66 on outer component 54 thereby removably affixing inner component 52, 152 to outer component 54. Specifically and as shown in FIG. 3, outer component 54 has a base 68 from which a first plurality of arms 70 and 72 extends. A second plurality of arms 74, 76, 78 also extends from base 68. Each of arms 70-78 includes at least one area that has hook portions 66. Of course, if inner component 52, 152 was provided with the hook portion, then outer component 54 would be provided with the loop portion.

If desired, base 68 can also be provided with hook portion 66. As shown in FIG. 3, first plurality of arms 70, 72 is shorter in length than second plurality of arms 74, 76, 78. Additionally, each arm of first plurality of arms 70, 72 has only one area with hook portion 66 while each arm of second plurality of arms 74, 76, 78 has more than one area (two are shown) with hook portion 66.

For the second plurality of arms 74, 76, 78, the area between the hook portions 66 on each arm, which is designated with the arm number and the letter "a" (e.g. 74a for arm 74), is an area that a pet can use its mouth and/or paw(s)/claw(s) to separate hook portion 66 from loop portion 64. Similarly, for all arms of both first 70, 72 and second 74, 76, 78 plurality of arms, the area between the end of the arm distal to base 68 and the hook portion distal to base 68, which is designated with the arm number and the letter "b" (e.g. 74b for arm 74), is an area that a pet can use its mouth and/or paw(s)/claw(s) to separate hook portion 66 from loop portion 64.

The particular arrangement of first plurality of arms 70, 72 and second plurality of arms 74, 76, 78 shown in FIG. 3, which is exemplary in nature and non-limiting, will now be described. If base 68 is viewed as a circle, arm 70 is at about 90° and arm 72 is at about 270°. Arm 74 is at about 0°, arm 76 is at about 135° and arm 78 is at about 225°. In other words, arms 70 and 72 extend outwardly from base 68 in opposite directions Use of treat dispensing toy 50 will now be described with reference primarily to FIGS. 5-7. Inner component 52 is positioned on base 68. If desired, a treat or other food or another motivator can be placed in compartment 56 of inner component 52. The placement of the motivator can be done in the presence of the pet so that the pet sees the motivator being hidden in compartment 56.

Regardless of whether or not a motivator is placed in compartment 56, the positioning of opening 58 relative to base 68 can be selected so that opening 58 is totally covered by base 68, partially covered by base 68, or not covered at all by base 68. Similarly, the positioning of opening 58 relative to arms 70, 72, 74, 76, 78 can be selected so that opening 58 is totally covered by arms 70, 72, 74, 76, 78, partially covered by arms 70, 72, 74, 76, 78, or not covered at all by arms 70, 72, 74, 76, 78 after wrapping of one or more arms 70, 72, 74, 76, 78 (described below). The aforementioned positioning of opening 58 is one variable feature of treat dispensing toy 50.

Another variable feature is the wrapping of one or more arms 70, 72, 74, 76, 78 about inner component 52. In particular, the number of arms 70, 72, 74, 76, 78 that are wrapped about inner component 52 and the sequence in which arms 70, 72, 74, 76, 78 are wrapped about inner component 52 can be varied. For each of arms 70, 72, 74, 76, 78 as they are wrapped about inner component 52, loop portion 64 couples to hook portion 66, thereby removably affixing inner component 52 to outer component 54. As more of arms 70, 72, 74, 76, 78 are wrapped about inner component 52, a stronger affixation of inner component 52 to outer component 54 forms. Additionally, the manner in which arms 70, 72, 74, 76, 78 are wrapped about inner component 52 can be varied to alter the affixation of inner component 52 to outer component 54.

As a result, for younger or older pets, pets of small stature, pets of less physical or mental ability, and/or pets not familiar with treat dispensing toy 50, the number of arms 70, 72, 74, 76, 78 and/or the manner in which arms 70, 72, 74, 76, 78 are wrapped about inner component 52 can be selected so that partially or totally removing inner component 52 from outer component 54 can be made less challenging. Once partially or totally removed, any motivator in compartment 56 can be accessed by the pet. Conversely, the number of arms 70, 72, 74, 76, 78 and/or the manner in which arms 70, 72, 74, 76, 78 are wrapped about inner component 52 can be selected so that partially or totally removing inner component 52 from outer component 54 can be made more challenging for pets that are familiar with treat dispensing toy 50 or otherwise have the physical and/or mental prowess.

Figure 11:
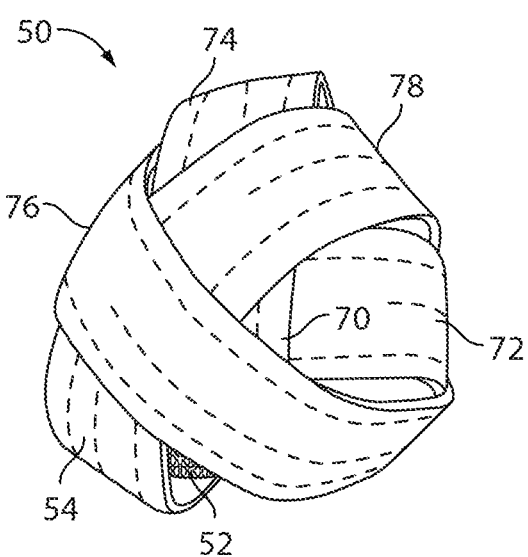
FIG. 11 shows a first configuration of an embodiment of the pet toy according to the disclosure.

For example, if arms 70, 72 are first wrapped around inner component 52 and then arms 74, 76, 78 are wrapped around inner component 52, areas 70b, 72b on arms 70, 72 will be relatively inaccessible, since they will likely be covered by arms 74, 76, 78. Since areas 70b, 72b assist in uncoupling hook portions 66 on arms 70, 72 from loop portion 64 on inner component 52, partially or totally removing inner component 52 from outer component 54 should be more challenging. This first configuration is shown in FIG. 11.

Figure 12:
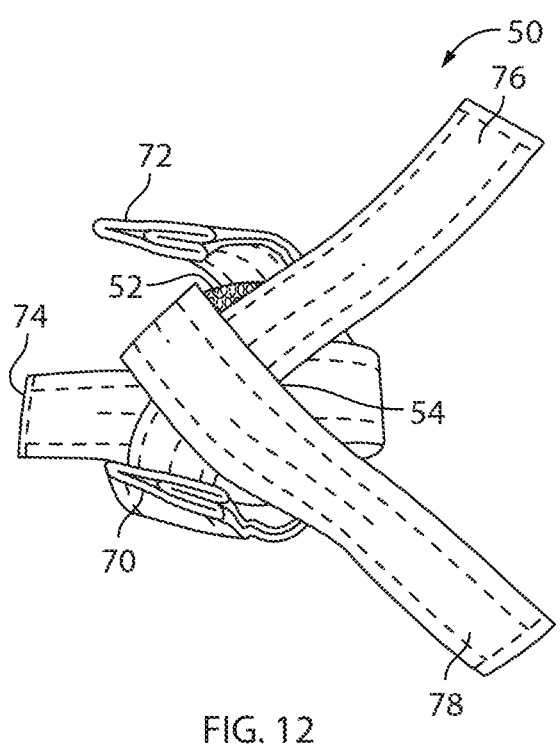
FIG. 12 shows a second configuration of an embodiment of the pet toy according to the disclosure.

In a second configuration shown in FIG. 12, arms 74, 76, 78 are first wrapped around inner component 52 and then arms 70, 72 are wrapped around inner component 52. In this configuration, areas 70b, 72b, 74b, 76b, 78b are relatively accessible since they will likely not be covered. Since areas 70b, 72b, 74b, 76b, 78b assist in uncoupling hook portions 66 on arms 70, 72, 74, 76, 78 from loop portion 64 on inner component 52, partially or totally removing inner component 52 from outer component 54 should be less challenging.

Although use of pet toy 150 is similar to pet toy 50, use of pet toy 150 will now be described primarily with reference to FIGS. 4 and 8-10.

Figure 4:
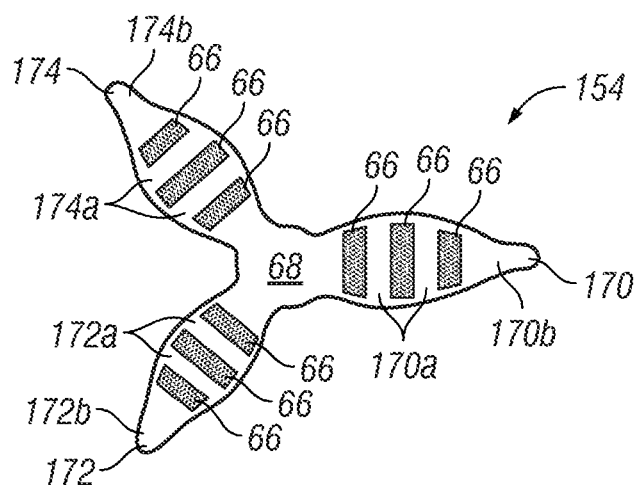
FIG. 4 shows a second embodiment of the outer component of the treat dispensing toy according to the disclosure.
Figure 7:
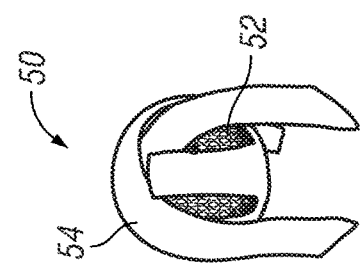
FIG. 7 shows a first embodiment of the treat dispensing pet toy according to the disclosure with the inner component of FIG. 1 enclosed by the outer component of FIG. 3.
Figure 10:
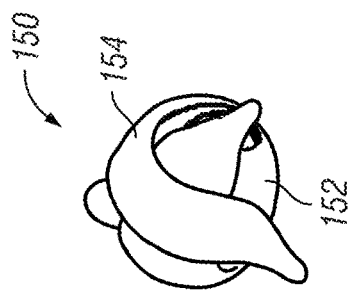
FIG. 10 shows a second embodiment of the treat dispensing pet toy according to the disclosure with the inner component of FIG. 2 enclosed by the outer component of FIG. 4.
Figure 6:
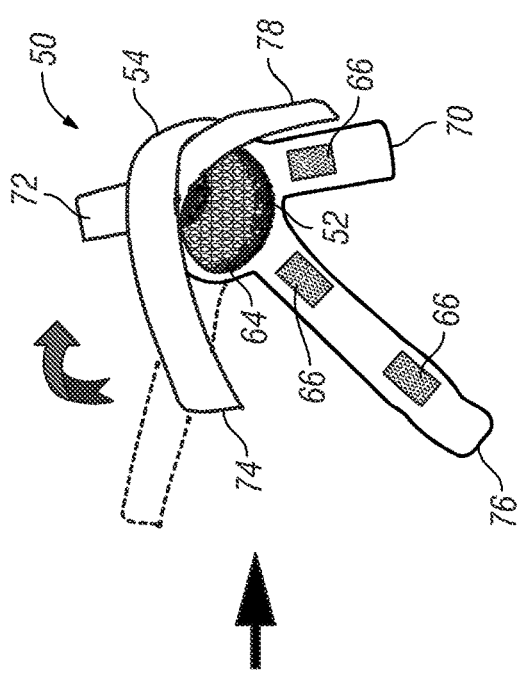
FIG. 6 is a second view of the inner component of FIG. 1 partially enclosed by the outer component of FIG. 3.
Figure 9:
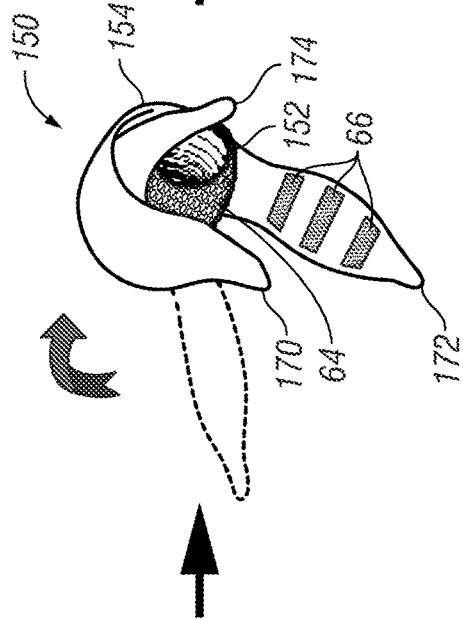
FIG. 9 is a second view of the inner component of FIG. 2 partially enclosed by the outer component of FIG. 4.
Figure 5:
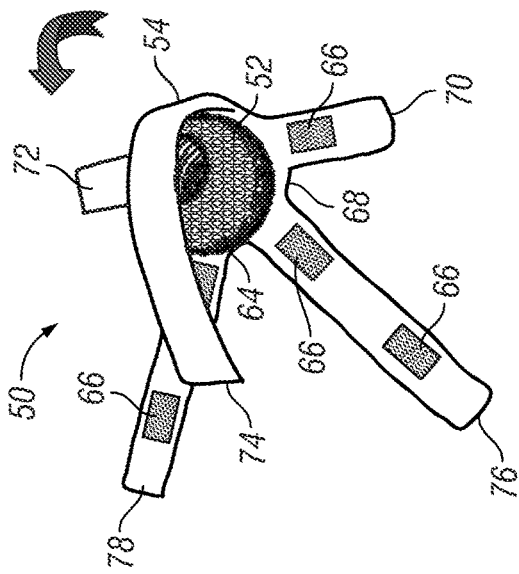
FIG. 5 is a first view of the inner component of FIG. 1 partially enclosed by the outer component of FIG. 3.
Figure 8:
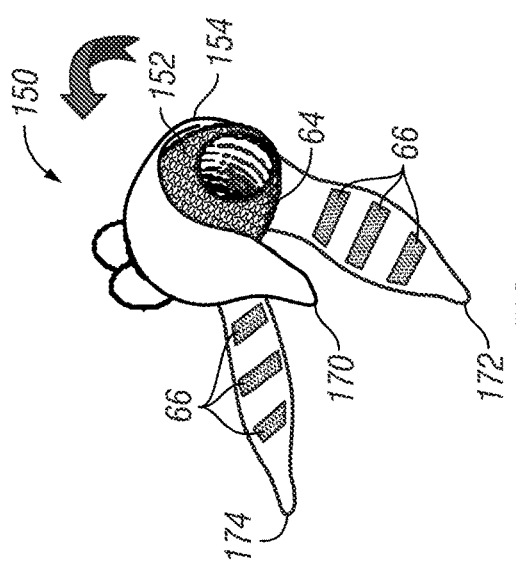
FIG. 8 is a first view of the inner component of FIG. 2 partially enclosed by the outer component of FIG. 4.

FIG. 4 shows outer component 154, like outer component 54, has a base 68. A plurality of arms 170, 172, 174 extends from base 68. Unlike outer component 54, arms 170, 172, 174 are all substantially similar in size and shape. Each of arms 170, 172, 174 includes at least one area that has hook portions 66. Of course, if inner component 52, 152 was provided with the hook portion, then outer component 154 would be provided with the loop portion.

If desired, base 68 can also be provided with hook portion 66. As shown in FIG. 4, each arm 170, 172, 74 has more than one area (three are shown) with hook portion 66.

The areas between the hook portions 66 on each arm, which is designated with the arm number and the letter "a" (e.g. 170a for arm 170), are areas that a pet can use its mouth and/or paw(s)/claw(s) to separate hook portion 66 from loop portion 64. Similarly, each arm 170, 172, 174 has an area between the end of the arm distal to base 68 and the hook portion distal to base 68, which is designated with the arm number and the letter "b" (e.g. 170b for arm 170), is an area that a pet can use its mouth and/or paw(s)/claw(s) to separate hook portion 66 from loop portion 64.

The particular arrangement of arms 170, 172, 174 shown in FIG. 4, which is exemplary in nature and non-limiting, will now be described. If base 68 is viewed as a circle, arm 170 is at about 0°, arm 172 is at about 135°, and arm 174 is at about 225°.

Inner component 152 is positioned on base 68. If desired, a treat or other food or another motivator can be placed in compartment 56 of inner component 152. The placement of the motivator can be done in the presence of the pet so that the pet sees the motivator being hidden in compartment 56.

Regardless of whether or not a motivator is placed in compartment 56, the positioning of opening 58 relative to base 68 can be selected so that opening 58 is totally covered by base 68, partially covered by base 68, or not covered at all by base 68. Similarly, the positioning of opening 58 relative to arms 170, 172, 174 can be selected so that opening 58 is totally covered by arms 170, 172, 174, partially covered by arms 170, 172, 174, or not covered at all by arms 170, 172, 174 after wrapping of one or more arms 170, 172, 174 (described below). The aforementioned positioning of opening 58 is one variable feature of treat dispensing toy 150.

Another variable feature is the wrapping of one or more arms 170, 172, 174 about inner component 152. In particular, the number of arms 170, 172, 174 that are wrapped about inner component 152 and the sequence in which arms 170, 172, 174 are wrapped about inner component 152 can be varied. For each of arms 170, 172, 174 as they are wrapped about inner component 152, loop portion 64 couples to hook portion 66, thereby removably affixing inner component 152 to outer component 154. As more of arms 170, 172, 174 are wrapped about inner component 152, a stronger affixation of inner component 152 to outer component 154 forms. Additionally, the manner in which arms 170, 172, 174 are wrapped about inner component 152 can be varied to alter the affixation of inner component 152 to outer component 154.

As a result, for younger or older pets, pets of small stature, pets of less physical or mental ability, and/or pets not familiar with treat dispensing toy 150, the number of arms 170, 172, 174 and/or the manner in which arms 170, 172, 174 are wrapped about inner component 152 can be selected so that partially or totally removing inner component 152 from outer component 154 can be made less challenging. Once partially or totally removed, any motivator in compartment 56 can be accessed by the pet. Conversely, the number of arms 170, 172, 174 and/or the manner in which arms 170, 172, 174 are wrapped about inner component 152 can be selected so that partially or totally removing inner component 152 from outer component 154 can be made more challenging for pets that are familiar with treat dispensing toy 150 or otherwise have the physical and/or mental prowess.

As should be evident for the foregoing, adjustable arms with hook and loop fasteners are used to create puzzles that keep pets mentally and physically stimulated longer through dynamic puzzle creation. These adjustable arms create dynamic connections that provide pets of varying abilities and ages with new forms of play by simply adjusting the connections to toy parts or treat dispensers.

The components of treat dispensing toy 50, 150 may be integrated or separated. Moreover, the structures disclosed herein may be achieved with more, fewer, or other components, and methods may include more, fewer, or other steps. Applicant does not intend any of the claims to invoke 35 U.S.C. 112(f) unless the words "means for" or "step for" are explicitly used in the particular claim.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale.

There are many different features to the present disclosure and it is contemplated that these features may be used together or separately. In this regard for example, inner component 52 can be used with outer component 154 and inner component 152 can be used with outer component 54. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A pet toy comprising:
    an inner component having a body with at least a portion of an outer surface of the body including one of a hook portion and a loop portion of a hook and loop fastener; and
    an outer component comprising a base with a plurality of arms extending from the base, each of the plurality of arms including at least one section with the other of the hook portion and loop portion of the hook and loop fastener,
    wherein with the inner component positioned on the base the plurality of arms is wrappable about the inner component such that the hook portion and loop portion of the hook and loop fastener engage to removably attach the inner and outer components, and
    wherein the plurality of arms is wrappable about the inner component in different configurations to alter the removable attachment of the inner and outer components.

2. The pet toy of claim 1, wherein the body has a compartment accessible through an opening.

3. The pet toy of claim 1, wherein the inner component is a pet toy retrofitted to have the one of a hook portion and a loop portion of a hook and loop fastener added thereto.

4. The pet toy of claim 2, wherein the inner component has the loop portion of the hook and loop fastener on the outer surface of the body.

5. The pet toy of claim 4, wherein the inner component is in the form of a ball.

6. The pet toy of claim 4, wherein the plurality of arms comprises a first plurality of arms and a second plurality of arms and wherein each of the first plurality of arms includes one section with the hook portion of the hook and loop fastener and each of the second plurality of arms includes at least two sections with the hook portion of the hook and loop fastener.

7. The pet toy of claim 6, wherein each of the first plurality of arms has a first length and each of the second plurality of arms has a second length and wherein the first length is less than the second length.

8. The pet toy of claim 7, wherein the first plurality of arms comprises first and second arms extending outwardly from the base in opposite directions.

9. The pet toy of claim 8, wherein the second plurality of arms includes a lead arm extending from the base such that the lead arm is substantially orthogonal to the first and second arms.

10. The pet toy of claim 9, wherein the second plurality of arms includes first and second base arms, the first base arm extending from the base such that first base arm and the first arm form an acute angle and the second base arm extending from the base such that second base arm and the second arm form an acute angle.

11. A pet toy comprising:
    an inner component having a body with a compartment accessible through an opening, wherein an outer surface of the body includes a loop portion of a hook and loop fastener; and
    an outer component comprising a base with a plurality of arms extending from the base, each of the plurality of arms having a distal end and including at least one section with the hook portion and loop portion of the hook and loop fastener,
    wherein for each of the plurality of arms the at least one section is spaced from the distal end,
    wherein with the inner component positioned on the base the plurality of arms is wrappable about the inner component such that the hook portion and loop portion of the hook and loop fastener engage to removably attach the inner and outer components, and
    wherein the plurality of arms is wrappable about the inner component in different configurations to alter the removable attachment of the inner and outer components.

12. The pet toy of claim 11, wherein the plurality of arms comprises a first plurality of arms and a second plurality of arms and wherein each of the first plurality of arms includes one section with the hook portion of the hook and loop fastener and each of the second plurality of arms includes at first and second sections with the hook portion of the hook and loop fastener.

13. The pet toy of claim 12, wherein each of the first plurality of arms has a first length and each of the second plurality of arms has a second length and wherein the first length is less than the second length.

14. The pet toy of claim 13, wherein the first plurality of arms comprises first and second arms extending outwardly from the base in opposite directions.

15. The pet toy of claim 14, wherein the second plurality of arms includes a lead arm extending from the base such that the lead arm is substantially orthogonal to the first and second arms.

16. The pet toy of claim 15, wherein the second plurality of arms includes first and second base arms, the first base arm extending from the base such that first base arm and the first arm form an acute angle and the second base arm extending from the base such that second base arm and the second arm form an acute angle.

17. A pet toy comprising:
    an inner component having a body with a compartment accessible through an opening, wherein an outer surface of the body includes one of a hook portion and a loop portion of a hook and loop fastener; and
    an outer component comprising a base with a plurality of arms extending from the base, each of the plurality of arms having a distal end and including at least one section with the other of the hook portion and loop portion of the hook and loop fastener,
    wherein for each of the plurality of arms the at least one section is spaced from the distal end, wherein with the inner component positioned on the base the plurality of arms is wrappable about the inner component such that the hook portion and loop portion of the hook and loop fastener engage to removably attach the inner and outer components, and wherein the plurality of arms is wrappable about the inner component in different configurations to alter the removable attachment of the inner and outer components.

18. The pet toy of claim 17, wherein the plurality of arms is symmetrically positioned about the base.

\* \* \* \* \*